Nov. 23, 1965     E. AUCKTOR     3,218,827
ROTARY JOINT

Filed March 28, 1963             5 Sheets-Sheet 2

Inventor:
ERICH AUCKTOR
By: McGlew and Toren
Attorneys

Nov. 23, 1965  E. AUCKTOR  3,218,827
ROTARY JOINT
Filed March 28, 1963  5 Sheets-Sheet 3

Inventor:
ERICH AUCKTOR
By: McGlew and Toren
Attorneys

Nov. 23, 1965   E. AUCKTOR   3,218,827
ROTARY JOINT

Filed March 28, 1963   5 Sheets-Sheet 4

Inventor:
ERICH AUCKTOR
By: McClew and Toren
Attorneys

Nov. 23, 1965   E. AUCKTOR   3,218,827
ROTARY JOINT
Filed March 28, 1963   5 Sheets-Sheet 5
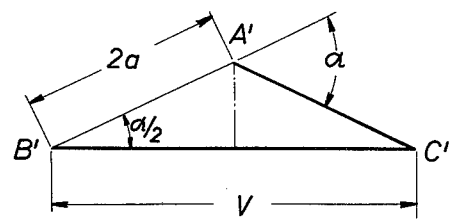
FIG. 11
FIG. 12a
PRIOR ART
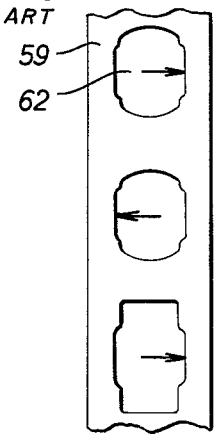
FIG. 12b
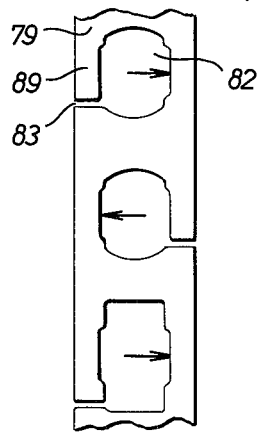
Inventor:
ERICH AUCKTOR
By: McGlew and Toren
Attorneys

United States Patent Office 3,218,827
Patented Nov. 23, 1965

3,218,827
ROTARY JOINT
Erich Aucktor, Offenbach (Main), Germany, assignor to Löhr & Bromkamp G.m.b.H., Offenbach (Main), Germany
Filed Mar. 28, 1963, Ser. No. 268,833
Claims priority, application Germany, Mar. 30, 1962, L 41,614; Apr. 2, 1962, L 31,670; Mar. 15, 1963, L 44,382
17 Claims. (Cl. 64—8)

This invention relates in general to a coupling or rotary joint, and particularly to a new and useful swivel-type or rotary joint.

The present invention has particular application in respect to the synchronized rotation of shafts through a swivel or rotary joint wherein the torque is transmitted by balls. In such construction the balls are guided between an inner and an outer joint body in longitudinal grooves defined in the respective bodies. The grooves are oriented so that their longitudinal center lines cross and the balls are held in a single plane. In order to obtain a synchronization of such joints, it is necessary that the balls be situated in a single plane and this plane divides the angle between the transverse center planes of the two joint bodies in half with each bending angle of the joint. These kinds of joints are known as constant velocity ratio joints. There are many different kinds of prior art constructions of groove guides which meet such a requirement.

In most of the known prior art swivel joint constructions to which the present invention pertains, the inner joint body, the cage, if one is provided, and the outer joint body are guided one upon the other through ball surfaces arranged about the center point of the joint. It is also known to guide the cage merely with an inner ball surface on an outer ball surface of the inner joint body and to arrange the cage at a distance from the outer joint body. All known synchronized swivel joint arrangements are stationary joints that is, the inner joint body and the outer joint body are not axially displaceable relative to each other.

It has been found, however, that in some instances it is desirable to permit relative axial displacement between the inner joint body and the outer joint body. Prior to the present invention this was possible only by mounting one of the bodies in respect to its shaft by means of a splined connection to permit axial displacement of the particular body in respect to its shaft. A disadvantage of such construction, however, is that even with relatively small torques an exceedingly high axial resistance is present, and thus great wear and only short life of such joints results. In addition, separate spline connections of the shaft are often very undesirable, for example for reasons of space.

In accordance with the invention there is provided a synchronized rotary joint with torque transmission by means of balls which are guided between an inner and outer joint body in longitudinal grooves which have crossing longitudinal center lines, and which is characterized by making the inner surface of the outer joint body a cylindrical surface so that it may be displaced in an axial direction in respect to this surface relative to the inner joint body. Thus, the invention overcomes the disadvantages of the prior art in that the joint may permit relative axial displacement without requiring the spline connections between the inner and outer body members of the joint. In addition, the axial displacement may be effected over a relatively large lever arm through the polished ball surfaces and the hardened groove tracks, and thus with a small friction factor and a relatively small resistance.

Particularly with high speeds and relatively high torques to be transmitted, the construction of the invention provides particular advantages due to the fact that the outer joint body, upon displacement, rolls on the inner joint body and thus a rolling movement takes place rather than a gliding movement, and thus a much smaller frictional resistance is present.

In constant velocity ratio joints, the balls should not be arranged in the grooves either too loosely or too tightly. If they are too tight, then difficulties occur if the speed is high, since the balls exert too great a resistance during their to and fro movement and upon rotation. On the other hand, if the balls are too loosely fitted, the balls will rattle and the joint will not work properly. This is particularly critical in joints wherein the balls are held in windows of a ball cage and where the longitudinal grooves of the balls open in an opposite wedge-like manner alternatively around the circumference. In order to prevent these disadvantages it is known to hold the balls under pretensioning. Thus, the balls may be held both in the windows under a pretensioning perpendicular to the plane of the balls, and also in the longitudinal grooves under a pretensioning which is caused by the cage and which is directed relative to the intersection point of the wedge angle of the longitudinal grooves. For this purpose, the prior art constructions have made use of relatively rigid and massive cages in order to prevent deformation and wear of the cage in the event that a thrust or force occurs in the direction of one of the shafts. The inventive joints, by contrast, can avoid any thrust in direction of one of the shafts by relative displacement of one of the two joint bodies, except when in the terminal position. This displacement makes it possible to construct the cage of the present invention in a resilient or springy manner and to provide the border webs of the cage windows which extend parallel to the plane of the balls with a slot on that side which faces the narrowing portion of the longitudinal grooves. Due to this slot, the desired pretensioning both of the balls in the windows and also in the grooves is significantly improved.

Accordingly, it is an object of this invention to provide an improved synchronized swivel-type rotary joint construction.

A further object of the invention is to provide a synchronized rotary joint with torque transmission by means of balls arranged to ride in a groove of an inner body which is adapted to connect to one shaft and in an internal groove of an outer body adapted to be connected to the other shaft, so that the outer body may be displaced in an axial direction relatively to the inner joint body.

A further object of the invention is to provide a pivotal joint shaft coupling which provides means for angular swivel movement of the shafts relative to each other, and also some axial movement.

A further object of the invention is to provide a pivotal joint for synchronizing shafts and the like which is simple in design, rugged in construction and economical to manufacture.

The various features of novelty which characterize the invention are pointed out with particularly in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 2:
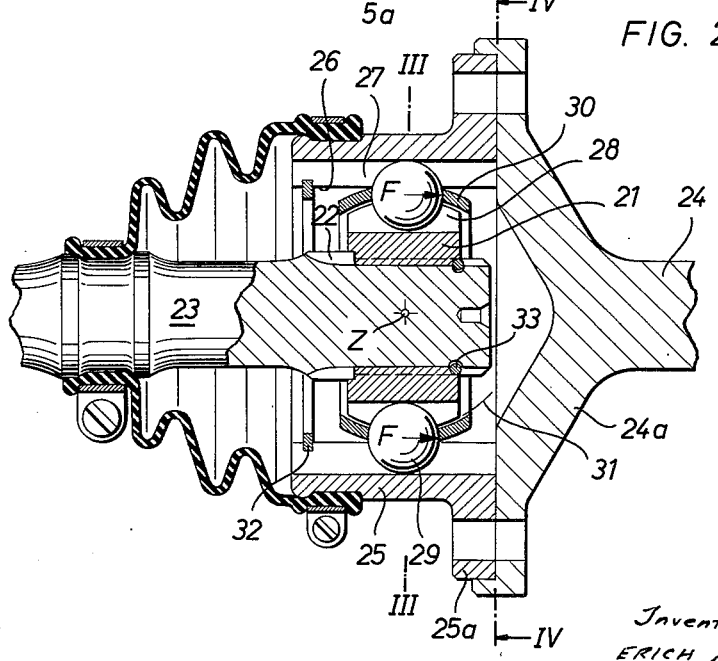
FIG. 2 is a section similar to FIG. 1 of another embodiment of the invention and taken along line II—II of FIG. 3, having ball grooves which are indicated as being turned into the plane of the drawing in order to facilitate the illustration thereof.
Figure 3:
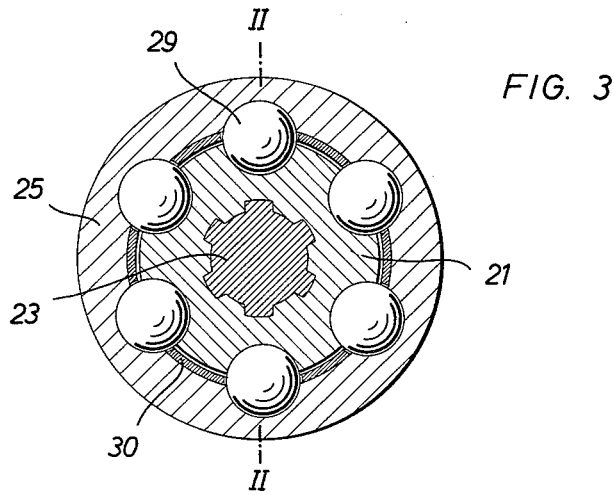
FIG. 3 is a section taken along the line III—III of FIG. 2.
Figure 5A:
Figure 5B:
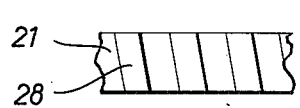
Figure 6:
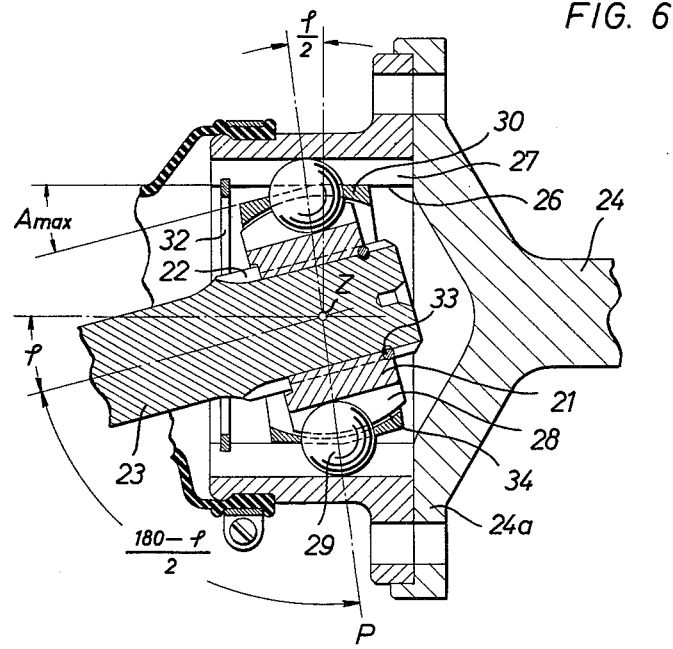
Figure 7:
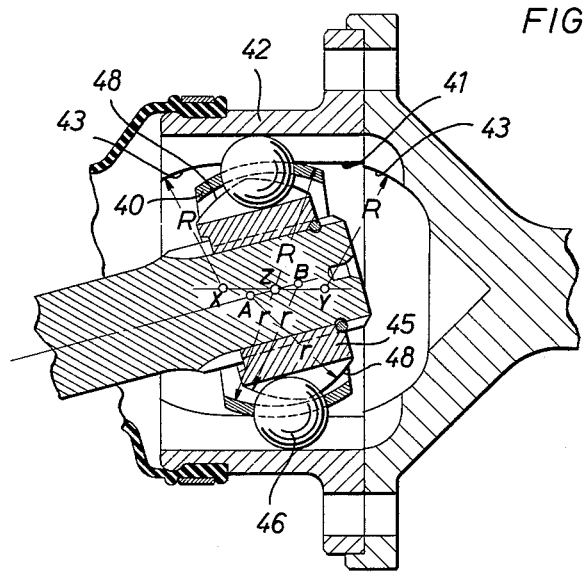
Figure 8A:
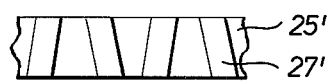
Figure 8B:
Figure 9:
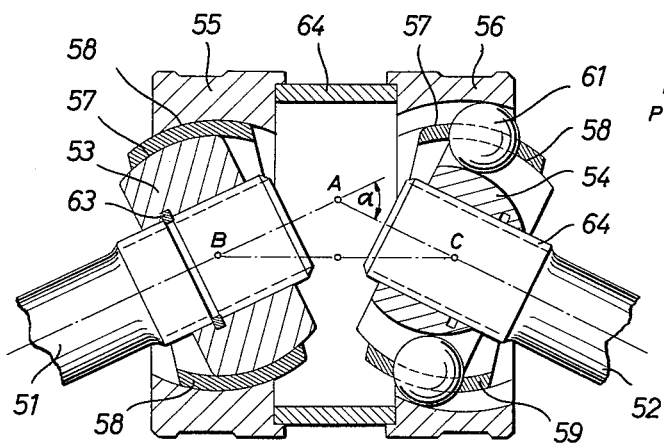
Figure 10:
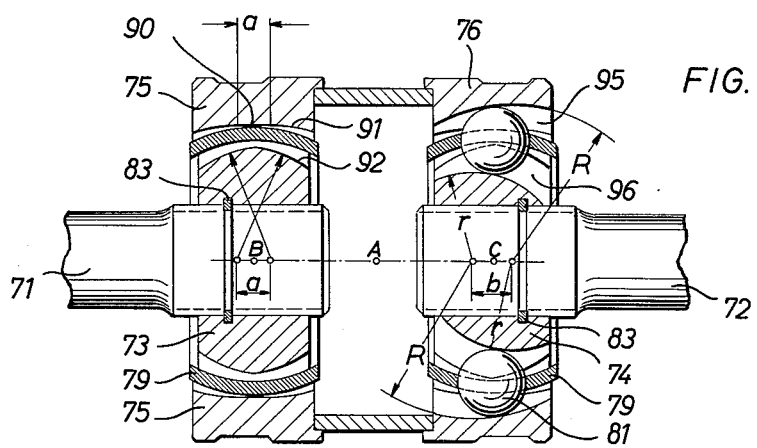

FIGS. 5a and 5b indicate development of the inner surface of the outer joint body and of the outer surface of the inner joint body, respectively;

FIG. 6 is a partial view similar to FIG. 2 with the joint indicated in a bent condition;

FIG. 7 is a view similar to FIG. 6 of another embodiment of the invention;

FIGS. 8a and 8b indicate developments of the inner surface of the outer joint body and of the outer surface of the inner joint body of a joint which is suitable for high speeds and constructed in the manner of the joint indicated in FIG. 2;

FIG. 9 indicates a prior art double joint in longitudinal section;

FIG. 10 indicates a longitudinal section of a double joint constructed in accordance with another embodiment of the invention;

FIG. 11 is a diagrammatic representation of the displacements of the joint shafts of the embodiments indicated in FIGS. 9 and 10;

FIG. 12a indicates a development of a prior art ball cage; and

FIG. 12b indicates a development of a ball cage constructed in accordance with the invention.

Figure 1:
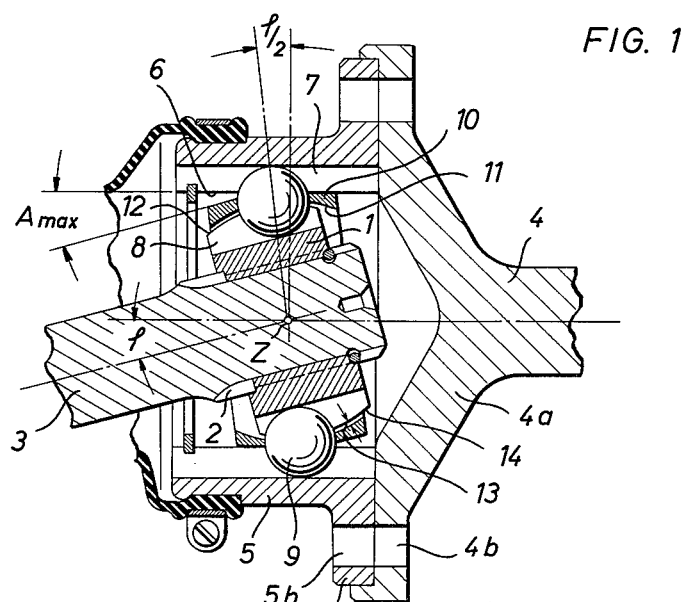
FIG. 1 is a longitudinal section of a synchronized displacement joint constructed in accordance with the invention and having a ball cage permitting large bending angles.

Referring to the drawings in particular, the invention as indicated in FIG. 1 comprises a joint which is particularly simple and is usable preferably only for bending angles which are larger than the friction angles of the cooperating material of the balls and of the longitudinal grooves. The joint comprises an inner joint body or connecting member 1 which is held on a shaft 3 for rotation with the shaft by means of spline gearing 2. A second shaft 4 is provided with a flange portion 4a having a plurality of annularly spaced apertured ears for facilitating the joining of this flange portion to a flange portion 5a, having similar apertured ears, of an outer joint body or connecting member 5. The flanges 4a and 5a are interconnected by means of bolts (not shown) which extend through the aligned annularly spaced apertured ears.

The outer joint body 5 is provided with an inner cylindrical surface 6, into which are worked or formed grooves 7 which in this embodiment extend parallel to the axis of the inner joint body 1. Balls 9 are arranged so that they are confined in the radially opposing grooves 7 and 8, the later extending parallel to the axis of inner joint body 1. The balls transmit torque from one shaft to the other through the walls of the inner joint body 1 and the outer joint body 5 which are adjacent the respective grooves 8 and 7.

In the embodiment of FIG. 1, a ball cage 10 is employed to hold the balls in a circumferentially spaced manner around the joint body 1. An inner surface 11 of the cage 10 is guided on an outer surface 14 of the inner joint body 1, and each of these surfaces is formed in a spherical or ball-shaped manner being centered at the point Z.

In order to make it possible to swivel or tilt the joint, that is, incline one shaft 3 in respect to the other shaft 4, the ball cage 10 is provided with the spherical surface 11 permitting it to ride over the outer surface 14. Toward the ends of the ball cage, however, the outer surface of cage 10 is constructed in a conically tapering manner set in accordance with the maximum bending angle P max. for which the joint is intended. In this manner the outer surface of the cage 10 cooperates with the inner cylindrical surface 6 of the outer joint body 5 and limits the bending of the joint. In addition, by this provision the cage becomes stronger at the end of the pivotal movement and thus is more rugged. In addition, the production is simplified in this manner. The joint of FIG. 1 may be used between bending angles of about 12 to 14° up to a bending angle of about 40°.

Even though the inner surface 11 of the cage 10 is formed in the manner of a ball or spherical surface and has the same radius as the outer ball surface 12 of the inner joint body 1, the construction permits the outer joint body to be displaceable on the balls 9 relative to the inner joint body 1 over a wide path. The start of such gliding displacement is considerably facilitated if, as indicated in FIG. 1 (for example at 13), there is provided a spacing between the inner surface 11 of the cage and the outer surface 14 of the inner joint body 1.

In the embodiment indicated in FIGS. 2 to 6 there is shown an arrangement in which an additional displacement is possible. In this embodiment an inner joint body is designated 21 and it is affixed to a shaft for rotation therewith by means of spline gearing 22. A shaft 24 is connected to the shaft 23 through a flange portion 24a and an outer body or connecting member 25 which is held thereto by means of bolts (not shown). The outer joint body 25 has a cylindrical inner surface 26 into which are worked grooves 27 which extend along a helical line. However, in order to simplify the representation, the grooves 27 in FIG. 2 are drawn into the plane of the drawing. Into the circumference of the inner joint body 21 there are also worked in grooves 28 which also extend along a helical line. The grooves 28 are also indicated as being in the plane of the drawing only for facilitating illustration thereof. The grooves extend in a helical direction in opposite manner, and balls 29 are arranged in the grooves to transmit the torque from the shaft 23 to the shaft 24, or vice versa.

The balls 29 are held in a cage 30 which is guided inwardly by means of its inner ball-shaped surface which is made centric to the center point Z, as in the other embodiment. A ball zone surface 31 is defined as the outer surface of the inner joint body 21, and this is also concentric to the center point Z.

Figure 4:
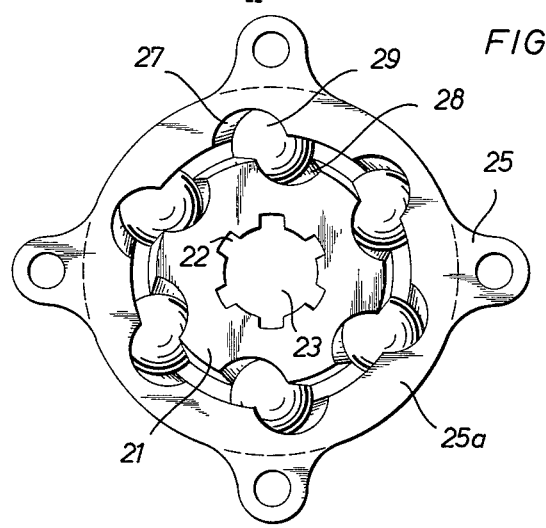
FIG. 4 is an elevational view taken along the line IV—IV of FIG. 2.

As indicated in FIGS. 4 and 5 grooves 27 extend in the outer joint body 25 along a helical line which rises in one direction, and the grooves 28 are defined in the inner joint body 21 along a helical line which rises in the opposite direction. This can be seen from FIGS. 5a and 5b in which a portion of the development of the outer joint body 25 and the inner joint body 21 are indicated. The balls 29 are always situated in the intersecting point of the center line of the grooves 27 and 28. When the joint is bent or the shaft 23 is arranged at an angle in respect to the shaft 24, as indicated in FIG. 6, the balls 29 migrate in the grooves 27 and 28 in a direction toward the right at the location below the center point Z and in a direction toward the left at a location above the center point Z. The migration is such that the center line from the center of the ball to the center point Z defines an angle of about one half the maximum bending angle.

In order that swivelling of the joint is made possible, the ball cage 30 is provided either with a ball zone in the manner indicated in FIG. 2, or as indicated in FIG. 6 it is rounded off at the center portion with a curvature having a center point at the point Z, whereas toward each end it is tapered in order to limit movement when the maximum bending angle is obtained. The outer surface of the cage does not obstruct the bending of the joint but instead reinforces the cage. As indicated in FIG. 6, the center point Z of the inner joint body 21 may migrate along the geometrical axis of the shaft 24 toward the right and left without changing the geometrical conditions of the joint, except that upon displacement of the center part Z on the axis of the shaft 24, the shaft 23 is imparted with an additional rotation in accordance with the angle of rise defined by the two grooves 27 and 28.

The joint indicated in FIGS. 2 to 6 thus permits a longitudinal displacement between the two shafts 23 and 24 in a somewhat different manner than the embodiment indicated in FIG. 1. The longitudinal displacement of the inner joint body 21 and the ball cage 30 guided thereon relative to the outer joint body 25 is limited on the one side by the flange 24a and the shaft 24, and on the opposite side by a securing or safety ring 32. Displacement of the inner body 21 along the shaft 23 on its spline gearings 22 is prevented by a split ring 33 with which the inner joint body 21 is anchored in position relative to the shaft 23.

To facilitate the start of a gliding displacement of the one shaft 23 relative to the shaft 24, it is preferred that the joint construction is such that a space 34 is defined between the inner surface of the cage 30 and the outer surface of the inner joint body 21. Such a spacing 34 between these parts, however, is not absolutely necessary for a glidingly displaceable joint of this type.

FIG. 7 indicates a modified embodiment, and the elements indicated may also be employed in a joint construction similar to that indicated in FIG. 1. In the embodiment of FIG. 7 the outer surface of a cage 40 is provided with a ball shape having a center at the center point Z. The radius thereof is designated R. The cylindrical inner surface 41 of the outer joint body 42 is curved at each end with the same radius R, but with centers of curvature located at points X and Y, as indicated by the axis line XZY in FIG. 7. The inner surface of the cage 40 also has a ball surface with a radius $r$ about the point Z. The inner joint body 45 has a cross-section corresponding to a pointed arch defining two ball surface zones with radii $r$ about two points A and B which are situated symmetrically in respect to the point Z and the axis of the inner joint body.

The displacement of the joint of FIG. 7 comprises an initial rolling movement which extends until the outer ball surface zone of the inner joint body 45 bears against the inner ball surface of the cage and of a subsequent gliding movement of the outer joint body on the balls 46 and on the cage 40. The balls 46 are held by the cage 40 on the inner joint body 45. The path XY is a maximum displacement path. The maximum rolling movement takes place over a path which is double the length of the distance between the points A and B. At the end of the displacement path, the outer ball surface of the cage 40 bears against the ball surface zone 43 of the outer joint body 42. When a ball zone of the outer surface of the inner joint body 45 bears against the ball surface of the cage, the joint has characteristics similar to a stationary joint. When the ball surface-shaped outer surface of the cage comes to bear against the ball surface zone 43 of the outer joint body 42, then the joint acts in the same manner as an ordinary stationary synchronized joint, except that there is a displacement possibility in one direction.

In all of the embodiments which have been described the displacement takes place primarily by gliding of the outer joint body on the balls and on the cage. The initiation of this gliding movement is accomplished preferably by rolling both joint bodies on each other and on the balls. This is made possible by providing spacing between the inner surface of the cage and the outer surface of the inner joint body. All these joints having the possibility of gliding displacement have in common that the balls transmit an axial thrust on the cage. For this reason, such joints are not very suitable for very high speeds.

If a high speed is desired, then joints may be used as indicated in FIGS. 2, 3, 4, 6 and 7, but not with the configurations of FIGS. 5a and 5b, but rather in the manner indicated in FIGS. 8a and 8b, that is in an alternately opposite sense around the circumference. As indicated in FIGS. 8a and 8b, the parts and the grooves are designated with the same numerals as in FIGS. 5a and 5b with the exception that they have a prime.

Grooves may also be arranged as indicated in the prior art construction of a joint shaft shown in FIG. 9. That is, the grooves may be defined in a plane which contains the common axis of the aligned shafts, and they may be such that they open in a wedge-like manner alternatively toward opposite or different directions. Since the balls act alternatively in opposing directions on the cage, the axial thrust on the cage is compensated in such joints so that they may be used for high speed.

There are also a number of other possibilities to arrange the grooves so that the axial thrust of the balls on the cage is compensated. Thus, for example, the longitudinal center lines of the longitudinal grooves may be helical lines, not only on cylindrical surfaces but generally on rotational surfaces about the common axis of the aligned shafts or even tangents at these helical lines. The joints for high speed operation have a common consideration in that they do not permit gliding displacement of the two joint bodies relative to each other. The prior art has been described in order to bring out a fundamental consideration of the present invention, wherein a gliding displacement between the two joint bodies or connecting members is possible.

In many cases only a relatively small displacement possibility of the two joint bodies relative to each other is necessary. For this purpose there is arranged a spacing between the inner surface of the cage and the outer surface of the inner joint body, so that both joint bodies can roll on each other in the same manner as was provided in the previously described showing with a further gliding displacement possibility for initiating the displacement. As indicated in the joint of FIG. 7, such a rolling displacement over a relatively wide path is possible since the balls, during rolling, traverse paths both relative to the outer joint body and also relative to the inner joint body, as indicated AB, so that the path AB is traversed twice.

This rolling of the two joint bodies relative to each other due to the distance between the cage and the inner joint body is possible in all arrangements of the longitudinal grooves having crossing or intersecting longitudinal center lines, such arrangements causing synchronization of the joint.

Referring in particular to FIG. 9 and the prior art construction shown therein, two shaft portions 51 and 52 are oriented at a bending angle $\alpha$ about the pivot point A. The shaft 51 pertains to the left-hand joint having an inner body 53, and the pivot point B, while the shaft 52 pertains to the right-hand joint with an inner body 54 and a pivot point C. In the left-hand joint the shaft 51 is rigidly connected with the body 53 by means of a securing ring 63, while in the right-hand joint the shaft 52 can be axially displaced in the inner body 54 through a spline connection 64. Outer joint bodies 55 and 56 are connected by a rigid connecting piece 64' so that a short joint shaft is formed. If the joint shaft is stretched under the action of the rotary torque, $\alpha=0°$, then the distance BC is enlarged to $AB+AC$. Thus, between the two joints there acts a high axial load until the spline connection 64 of the shaft 52 yields by displacement in respect to the inner joint body 54. This axial force increases significantly the friction in the spheric centering surfaces 57 and 58 between the cage 59 and the two joint bodies, whereby the cage is clamped. In FIG. 10 there is indicated a similar joint body constructed in accordance with the invention, and in this embodiment the shafts 71 and 72 are secured axially in the inner joint bodies 73 and 74 by securing rings 83, so that the shafts 71 and 72 are not displaceable relative to inner bodies 73 and 74, respectively. The cage 79 is radially guided in the outer joint body 75 or 76 and it is axially displaceable about the length $a$ along the cylindrical inner surface 90 of the outer joint body 75 or 76.

In a manner similar to the joint of FIG. 7, the cylindrical inner surface 90 is made so that its ends have ball surface zones 91 with the same radius as the outer surface of the cage 79. The inner joint body 74 has a cross-section somewhat like a pointed arch and is composed of two ball surface zones 92 at each end with the same radius as the spherical inner surface of the cage 79, but having center points which are situated on the shaft axis at spaced locations symmetrical to the swivel center points B and C of the two joints. The two center points have a distance $a$ from each other. The longitudinal grooves 95 and 96 of the two joint bodies are situated in planes which contain the common axis of the aligned shafts 71 and 72, and they open alternatively in a wedge-like or beak-like manner in opposite directions. Their longitudinal center lines are circular arcs with radii R and $r$ which intersect in the plane, the circular arcs being formed about the center points on the shaft axes which have a distance $b$ symmetrical to the swivel points B and C.

A radial guiding of the cage on the inner joint body does not take place. The centering takes place solely on the balls 81. The two ball surface zones may take the form of being rounded off or cylindrically flattened or any other form.

In the terminal positions of the rolling movement the cage bears both at the outer jacket body and also at the inner joint body on a ball surface. In this manner the joint acts in a terminal position like a common stationary joint. If an axial force, for example, in the direction of the pulling apart of the two shafts 71 and 72 acts on a stretch double displacement joint wherein the bodies 73 and 74 assume the center of their displacement paths (thus, as shown in FIG. 2, they assume the positions B and C), then the ball 81 rolls from the shown center positions B and C. The balls roll each in a path $a$ divided by two, both in the grooves of the outer joint bodies 75 and 76, and also on the inner joint bodies 73 and 74, until the outer ball surfaces of the cage bear at the ball surface zone of the inner surfaces of the outer joint body. Both joints have moved away from each other during the rolling of the balls from the center position of the joint about an amount equal to $2a$. However, if an axial force acts on the shafts 1 and 2 in a direction toward each other, then the same rolling movement of the balls 81 in the grooves takes place, and thus movement of the joints toward each other is effected of about the same value $2a$. The maximum displacement possibility of the double joint, in accordance with the embodiment of FIG. 10, thus amounts to Z max.=$4a$ or, according to FIG. 11, wherein the shafts 71 and 72 are oriented or bent at an angle $\alpha$ to each other such that V max.=$4a \times \cos \alpha/2$. The measure for the distance $\alpha$ depends on the thickness of the cage 79, and also depends on the distance $b$ of the center points of the contacting normals R and $r$ which form the wedge angle with the axis of the shafts 71 and 72, respectively. From the kinematics of the joint, it is clear that $a$ is smaller than $b$. In practice, joints wherein $a$ is slightly smaller than $b/2$ have proved to be very satisfactory if the size of the double displacement joint, as indicated in FIG. 2, has an axial displacement path of about 16 mm.

When joints are used for higher speeds wherein the grooves open alternatively in a wedge-like manner, then such joints are very sensitive if the balls are fitted too loosely or too tightly. Thus, the fit of the balls 81 in the grooves of the bodies must be satisfactory, and, in addition, the fit must be accurate in the windows 82 of the cage 10. Therefore, in accordance with the invention the cage and the window openings thereof are elastically constructed, so that the balls 81 are guided resiliently in the window openings 82 (FIG. 12$b$) and are also held resiliently in the wedge openings of the groove path.

FIG. 12$a$ indicates a developemnt of a cage of a known construtcion, wherein the size of the ball diameter minus the width of the window 62 produces a resilient mounting of the balls 61 in the windows 62. The diameter of the balls minus the size R–$r$, according to FIG. 10, produces the springiness of the balls 61 in the wedge opening of the grooves.

In FIG. 12$b$ there is indicated a development of the cage according to the invention. Assuming that the cage indicated in FIG. 12$b$ is similar in dimension to that indicated in FIG. 12$a$, then the cage of the invention has a greater springiness, due to the cut-outs 83 in the webs 89, which cut-outs effect the narrowing wedge of the longitudinal grooves. Such a cage has about eight times as much resiliency for the balls in the window openings 82, and about thirty times better springiness of the balls in the wedge openings of the grooves as compared to the cage of FIG. 12$a$. The construction of FIG. 12$b$ also requires less exactness of dimensions for the window 82 by a factor of about five times.

When the joint is to be assembled, the cage 79 should be inserted so that the non-interrupted web extends in a direction of the wedge angle opening of the grooves so that the balls load the cage 79 in the direction shown by the arrows.

While specific embodiments of the invention have been shown and described in detail to illustrate the application of the inventive principles, it will be understood that the invention may be embodied otherwise without departing from such principles.

What is claimed is:

1. In a synchronized rotary joint including an inner body, adapted to be connected to a first member, such as a first shaft, an outer body, adapted to be connected to a second member, such as a second shaft, with torque transmission between the bodies by means of balls guided between the two bodies in longitudinal grooves in the facing surfaces of the two bodies, opposing grooves in the two bodies having longitudinal center lines which cross, and an apertured cage holding the balls in a common plane: the improvement comprising said outer body having a cylindrical inner surface; said inner body having a spherical outer surface; and said cage having the form of a substantially spherical shell axially displaceable along said cylindrical inner surface, and having a spherical inner surface centered on the axis of the outer surface of said inner body and spaced from the outer surface of said inner body a radial distance sufficient to provide for limited relative axial displacement of said inner body and said cage by rolling of said balls along said grooves.

2. In a synchronized rotary joint according to claim 1, the longitudinal center lines of said grooves extending parallel to the respective axis of said inner and outer joint bodies.

3. In a synchronized rotary joint according to claim 1, the longitudinal center lines of said grooves being helical lines which rise in both joint bodies in the same direction.

4. In a synchronized rotary joint according to claim 1, wherein the grooves defined in said inner and outer joint bodies have longitudinal center lines lying in planes including the axes of the shafts which are to be contained in said respective joint bodies, the longitudinal center lines of the grooves being opposing circular arcs formed about two circle center points which are situated on a common axis of the aligned shafts symmetrical to a pivot center point of the inner joint body, the grooves opening in a wedge-like manner alternatively in opposite directions, the length of the displacement path of said cage relative to the inner joint body between two terminal positions wherein said cage inner surface bears against the outer surface of the inner joint body being smaller than the distance of the circle center points of the longitudinal center lines of the longitudinal grooves, but somewhat bigger than half such distance.

5. In a synchronized rotary joint according to claim 1, the outer surface of the inner joint body comprising two spherical zones merging into each other in such a manner that the cross-section of said inner joint body has about the shape of a pointed arch.

6. In a synchronized rotary joint according to claim 1, the cylindrical surface of said outer joint body changing over into a spherical surface having the same radius as the outer surface of said cage, the cage bearing against said spherical surface when the joint has reached an end position caused by the rolling of the balls between the inner and outer joint bodies at which the inner surface of the cage comes to bear at the outer surface of the inner joint body.

7. In a synchronized rotary joint according to claim 1, in which said cage has an outer spherical surface with at least one side formed in a conical manner at an angle which limits the bending range of the joint by the bearing of the outer surface of said cage against the inner surface of said outer joint body.

8. In a rotary joint according to claim 1, wherein said longitudinal grooves open alternately in opposite directions in a wedge-like manner, said cage for holding the balls being made in a resilient manner with border webs on each side of the central windows defined for said walls, said cage border webs extending parallel to the plane of said balls and having slots on a side which face the narrowing wedge of said grooves, the balls being held in the windows of said cage under a pretension in a direction perpendicular to the plane in which the balls are held by said cage and in said longitudinal grooves by means of a pretensioning which extends toward the point of intersection of the wedge angle and said longitudinal grooves.

9. A rotary joint according to claim 1, wherein the grooves of said inner and outer bodies extend obliquely in respect to the axes of the associated bodies.

10. A rotary joint according to claim 1, wherein the grooves of said inner and outer bodies extend obliquely upwardly toward at least one side thereof.

11. In a rotary joint according to claim 1, said first member comprising a first shalf element; said second member comprising a second shaft element; said outer body being an annular element; said second shaft element including a flange adapted to be connected to said annular element, and said flange limiting lateral movement of said inner body and said first shaft element in one axial direction.

12. A rotary joint according to claim 11, including means carried by said outer body for limiting axial movement of said inner body and said first shaft element in the opposite axial direction from said second shaft element.

13. A rotary joint according to claim 1, said cage being engageable with the cylindrical surface of said outer body upon tilting movement to limit the maximum tilting movement of said joint.

14. A rotary joint according to claim 1, said cage having window slots at spaced locations around the periphery for accommodating said balls, and having webs on a side of said slots which are constructed to make the cage resilient.

15. A rotary joint according to claim 14, wherein said webs of said cage are cut away to afford resiliency.

16. A rotary joint according to claim 1, wherein said grooves extend in a helical manner on each of said inner and outer joint bodies.

17. A rotary joint according to claim 16, wherein said grooves are arranged alternately opposite around the respective outer and inner circumferences of said inner and outer joint bodies.

References Cited by the Examiner

UNITED STATES PATENTS

| | | | |
|---|---|---|---|
| 2,309,939 | 2/1943 | Dodge | 64—21 |
| 2,911,268 | 11/1959 | Staunt | 308—201 |
| 2,911,805 | 11/1959 | Wildhaber | 64—8 |
| 3,017,755 | 1/1962 | Miller | 64—21 |
| 3,045,755 | 1/1962 | Bellomo | 64—21 |
| 3,067,595 | 12/1962 | Faure | 64—21 |
| 3,091,102 | 5/1963 | Linderme | 64—8 |
| 3,105,369 | 10/1963 | Mazziotti et al. | 64—21 |
| 3,112,625 | 12/1963 | Leto | 64—8 |

BROUGHTON, G. DURHAM, *Primary Examiner.*

ROBERT C. RIORDON, MILTON KAUFMAN,
*Examiners.*